United States Patent
Khetan et al.

(10) Patent No.: US 8,565,069 B2
(45) Date of Patent: Oct. 22, 2013

(54) METHOD OF SHRINKING A DATA LOSS WINDOW IN A PACKET NETWORK DEVICE

(75) Inventors: Vikas Khetan, Saratoga, CA (US); Hitha Shetty, San Jose, CA (US)

(73) Assignee: Force10 Networks, Inc., San Jose, CA (US)

( * ) Notice: Subject to any disclaimer, the term of this patent is extended or adjusted under 35 U.S.C. 154(b) by 331 days.

(21) Appl. No.: 12/952,996

(22) Filed: Nov. 23, 2010

(65) Prior Publication Data
US 2012/0127854 A1    May 24, 2012

(51) Int. Cl.
*G01R 31/08*    (2006.01)

(52) U.S. Cl.
USPC .......................................... 370/217; 370/218

(58) Field of Classification Search
USPC ......... 370/217–218, 221, 225, 228, 254–256, 370/395.53, 395.54, 400–401, 18
See application file for complete search history.

(56) References Cited

U.S. PATENT DOCUMENTS

| | | | |
|---|---|---|---|
| 5,909,686 A * | 6/1999 | Muller et al. ........................ 1/1 |
| 6,026,075 A * | 2/2000 | Linville et al. ................. 370/236 |
| 6,735,198 B1 * | 5/2004 | Edsall et al. .................. 370/389 |
| 2004/0078625 A1 * | 4/2004 | Rampuria et al. ................. 714/4 |
| 2006/0262791 A1 * | 11/2006 | Kadambi et al. .............. 370/389 |
| 2007/0086361 A1 | 4/2007 | Allan et al. |
| 2010/0135289 A1 | 6/2010 | Bowes |
| 2011/0019539 A1 * | 1/2011 | Suzuki et al. ................. 370/225 |

\* cited by examiner

*Primary Examiner* — Chandrahas Patel
*Assistant Examiner* — Kabir Jahangir
(74) *Attorney, Agent, or Firm* — Haynes and Boone, LLP

(57) ABSTRACT

A packet network device includes a control module, one or more line cards each one or which includes a plurality of ingress and egress ports, and each of the ingress and egress ports are connected to external network links. The line cards maintain forwarding tables and include functionality that employs information in the forwarding tables to determine how incoming packets of information should be forwarded. The control module includes functionality that operates to learn reachability information about other devices connected to the network that are and to use this reachability information to update forwarding tables maintained on the line cards. The control module also includes an enhance ARP functionality that operates in cooperation with standard ARP functionality and other network protocols included on the control module to diminish the amount of data lost in the event that a link connected to one of the egress ports fails.

16 Claims, 8 Drawing Sheets

FIG. 1

COMMUNICATION NETWORK 10

L2/L3 ENTRIES PRIOR TO LINK FAILURE

FIG. 6A

L2/L3 ENTRIES AFTER LINK FAILURE & PRIOR TO UPDATE

FIG. 6B

L2/L3 ENTRIES PRIOR TO LINK FAILURE

METHOD OF SHRINKING A DATA LOSS WINDOW IN A PACKET NETWORK DEVICE

BACKGROUND

1. Field of the Invention

The present disclosure relates generally to packet network devices such as switches and routers, and more particularly to methods for diminishing the loss of data in a packet network device due to network topology changes.

2. Description of Related Art

Figure 1:
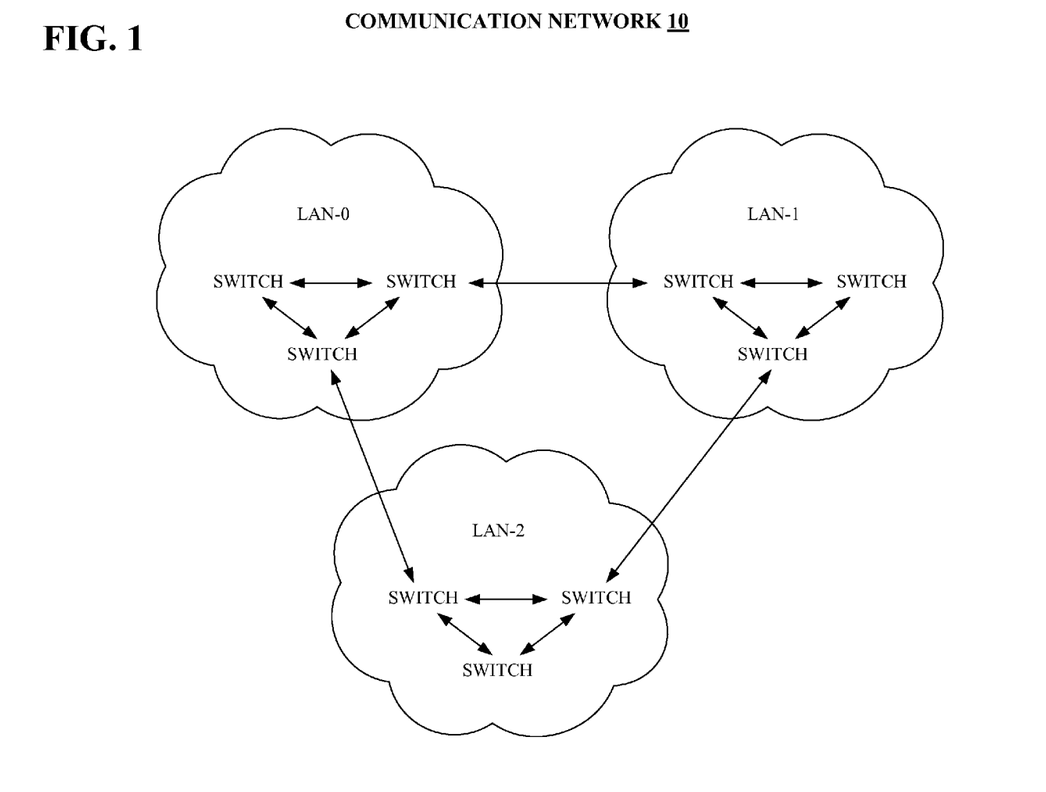
FIG. 1 illustrates a communication network including multiple LANs.

Large communication networks are typically comprised of interrelated local area networks or LANs which are in turn comprised of some number of packet network devices, such as routers and/or switches, and end user devices such as servers or some other form of computational device. FIG. 1 illustrates a communications network 10 that includes three LANs, LAN-0, LAN-1 and LAN-2. At least one packet network device in each of the LANs of FIG. 1 is connected over a communication link to at least one other ROUTER in the LAN in which they are located, and at least one packet network device in each LAN can be connected over a communication link to at least one device in each of the other two LANs. Each packet network device, which can be a switch a router or both, generally operates to receive packets of information, process the packets and forward the packets to their correct destination. Typically each LAN is managed as a separate network entity from other LANs, so that each LAN can have different applications running, can have different levels of security and can have some number of routers that can be configured and managed by a network administrator separately from routers included in other LANs.

Figure 2:
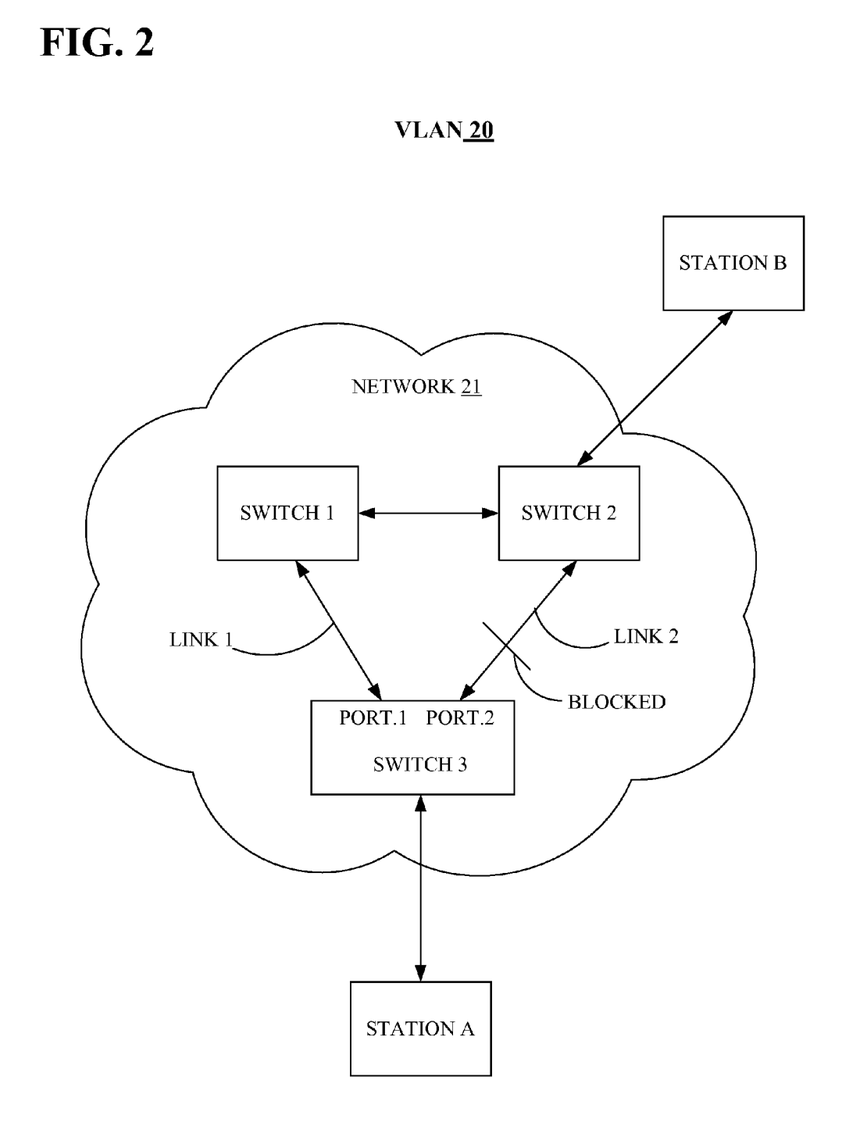
FIG. 2 illustrates VLAN configured in a network.

As opposed to the LANs illustrated and described with reference to FIG. 1, a virtual local area network or VLAN relates to routers that are grouped logically as opposed to physically. Typically, a VLAN is comprised of multiple routers at least some of which can be located in different LANs. So for instance, referring back to FIG. 1, one router in LAN-0, one router in LAN-1 and one router in LAN-2 can be members of the same VLAN, such as VLAN 20 shown with reference to FIG. 2. Router membership in a VLAN can be managed by a central administrator, and packets transmitted from one VLAN member to another can be tagged according to a network standard such as IEEE 802.1Q. The tag is a field in a packet or frame that includes, among other things, a VLAN Identifier (VID), which is a 12-bit field specifying the VLAN to which the packet or frame belongs. Each switch can include a VLAN table which is a listing of end-Stations or Next Hop Router's MAC address and ports through which the end station or the next-hop router on that VLAN are reachable. So for instance, the Switch-3 in VLAN 20 of FIG. 2 can maintain one VLAN table entry that is comprised of a MAC address assigned to Station-1 and the identity of port 2. Such a VLAN table can include many MAC addresses associated with each of the Stations (or next-hop Routers) in the VLAN 20 and the corresponding ports on each Switch from which the Stations (or next-hop Routers) are reachable.

Packet network devices such as routers or switches can include a chassis with separate cards or modules for the provision of different functions associated with their operation. Such devices can include a control module that operates to provide overall control of the device operation and to provide routing and/or switching protocol functionality, one or more line cards to provide packet processing and forwarding functionality and one or more switching cards to switch packets between the line cards. All of these cards can be connected to a backplane that is arranged in the network device chassis. The router/switch 30 in FIG. 3 includes a control module and a plurality of line cards (only one shown) all connected by a switch fabric (not shown). The control module is comprised of, in this case, two route processing modules L2-RPM and L3-RPM, each of which can operate to perform different functionality in support of the overall system operation. In this case, the L3-RPM is configured with, among other things, layer 3 routing protocols such as the open shortest path first (OSPF) protocol, the address resolution protocol (ARP), the border gateway protocol (BGP) to name a few. The layer 3 routing protocols generally operate to discover network address information about other devices reachable by router 30 and they operate to build and maintain layer 3 routing tables.

Figure 3:
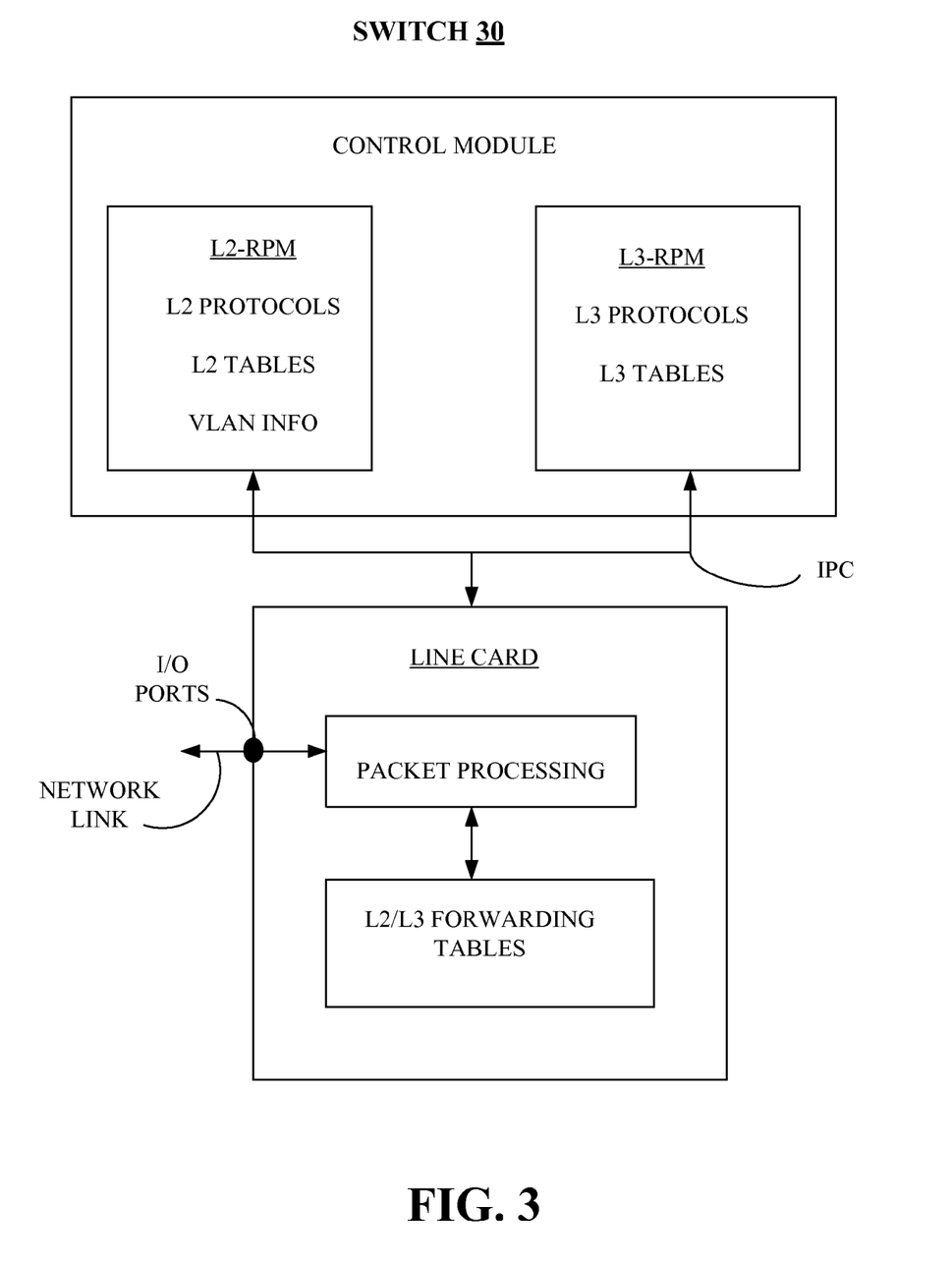
FIG. 3 is a block diagram showing the functional elements of a typical packet network device.

Continuing to refer to FIG. 3, the L2-RPM, among other things, runs layer 2 or link layer network protocols such as any one or more of a standard spanning tree protocol (STP, RSTP, MSTP) which generally operate to discover L2 information about network devices reachable from the router 30, to monitor the status of network links connected to the packet network device and to use this information to build switching tables and to create a loop-free topology (spanning tree) within a network of layer-2 routers. The L2-RPM can include a link state database where the state of each link to and from the SWITCH 30 is stored, and it can also include information related to one or more VLANs in a VLAN table. This VLAN table information typically includes, among other things, the VLAN ID (VID) assigned to a particular VLAN, which in this case can be the VLAN 20 of FIG. 2. The router 30 of FIG. 3 also includes one or more line cards that implement packet processing functionality, memory for storing L2/L3 forwarding tables and one or more agents that operate to maintain the forwarding tables stored in line card memory. The packet processing functionality is connected to input/output ports that generally operate to send and receive packets of information over links between the routers in a network. Processes operating on the control module and line cards can communicate with each other over an inter-process communication bus.

From time to time, the communication links between routers fail. When this happens, it is imperative that the routers respond quickly to re-route network traffic to a known good link in order to minimize the loss of data. It is desirable to perform this re-routing of traffic in hardware, as hardware can be designed to operate very quickly to perform the forwarding table updates needed to re-route the network traffic. One way this can be performed in hardware is for a packet processor to examine the MAC address in a layer-3 table associated with a port connect to a failed link, and then use this information as a pointer into a layer-2 table to identify the port over which to send the packet. This works because STP very quickly disables the port connected to the failed link and enables a standby port and makes this change in the layer-2 table. However, due to hardware limitations in some packet network devices, it is only possible to use software to effect the re-routing of network traffic upon the failure of a link.

SUMMARY

When a packet network device becomes aware that a link connecting one router to another router in a VLAN has failed, it operates to immediately invalidate the L2/L3 forwarding table entries associated with a port connected to a failed link, and then flush these entries from the forwarding tables. Information needed to update the L2 table entries can be re-learned in a relatively short period of time by hardware/firmware on the packet network device. However, software processes employed to re-learn L3 forwarding table information takes an unacceptably long period of time. Accordingly, the address resolution protocol (ARP) proceeds to gather address information from other routers in the VLAN with which the packet network device can communicate and use this address information to update the forwarding table entries that were flushed. As the process of flushing ARP cache, gathering address information, calculating new routes and updating the routing table entries can take several seconds, packets can be dropped which would otherwise be processed using the next hop information that has been flushed from ARP cache.

In one embodiment, packet network device software operates to diminish the amount of data that is lost due to the failure of a link connected to a first port over which the data is to be transmitted by disabling the first port connected to the failed link and enabling a second port that is a member of the same VLAN, inhibiting the flushing of layer-3 forwarding table entries associated with the first port, replacing at least a portion of the forwarding table entries associated with the first port with a multicast ID of the VLAN for as long as it takes the software to re-learn network address information that is used to update the layer-3 table entries. By placing the multicast ID of the VLAN into a portion of the forwarding table entries during the period of time that layer-3 forwarding table update information is collected, data that is intended for transmission over the failed link will continue to flow.

BRIEF DESCRIPTION OF THE DRAWINGS

The present invention can be best understood by reading the specification with reference to the following figures, in which.

DETAILED DESCRIPTION

Figure 4:
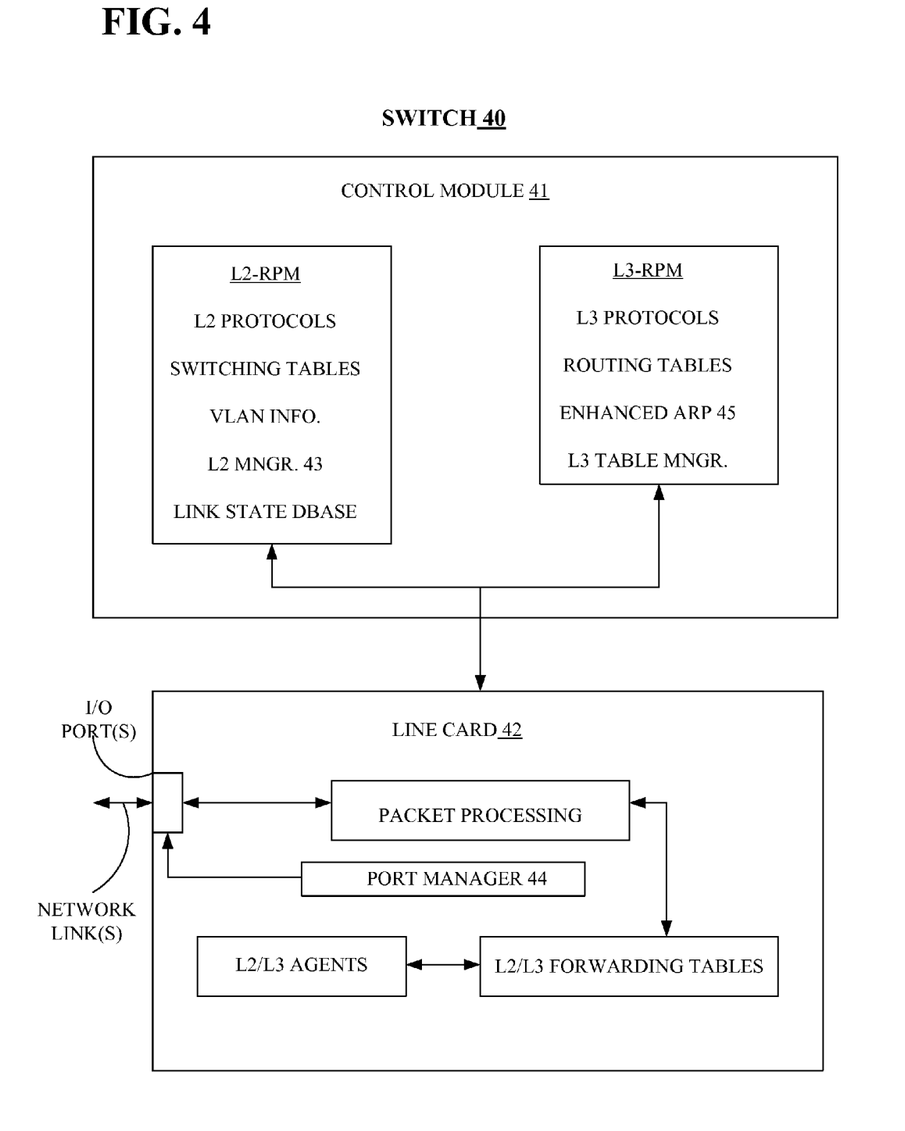
FIG. 4 is a block diagram of the functional elements of a packet network device according to one embodiment.

FIG. 4 is a block diagram showing a packet network device 40 that includes functionality comprising one embodiment. The packet network device in this case can be a switch, a router or a combination of both; however, for the purpose of this description, the packet network device is hereinafter referred to as switch 40. One or more ports on the switch can be a member of a VLAN, such as the VLAN 20 in FIG. 2, and this switch 40 can be designed to perform L2 and L3 forwarding table entry updates in software as the result of the failure of a link to which the switch is connected. Switch 40 is very similar to the switch 30 described earlier with reference to FIG. 3, with the exception that it includes an APR cache flush over-ride function which is incorporated into an enhanced ARP function 45. This over-ride function temporarily prevents the ARP from flushing invalid layer-3 ARP cache entries in the event of a link failure, and it operates to replace the unicast egress port ID in the ARP entry with a VLAN multicast port ID associated with a VLAN-ID (VID) assigned to the port connected to the failed link. The VLAN multicast port ID can be included a L-2 manager 43. The VLAN multicast port ID can point to a list of two or more port identifies on the switch. So, in the event of a link failure in a VLAN, and where the router is running a version of STP, packets that would otherwise be dropped by the switch are flooded to all of the ports identified by the VLAN multicast port ID. At the same time as the over-ride function is invoked, the ARP modules relays an ARP request to neighboring Routers to get the ARP resolved for the entry for which flush was bypassed. Once an ARP reply is received back, the ARP module replaces the entry (which was bypassed) with the new information from the ARP reply (information updated may include MAC address and the Port ID).

Continuing to refer to FIG. 4 in more detail. The switch 40 is comprised of a control module 41 and one or more line cards 42 in communication with each other over an inter-process communication link or bus (IPC). The line card 42 is comprised of the same functionality as the line card that was described with reference to FIG. 3 and so will not be described again here in more detail except to mention that it includes packet processing functionality and layer-2 and layer-3 forwarding tables which are maintained by agents, L2-Agent and L3-Agent, running on the line card 42 and the layer-2 and layer-3 managers running on the L2 and L3 RPMs respectively. The packet processing functionality is connected to a plurality of input/output ports which are in turn connected to the physical links over which data is transmitted between one router and another router. The control module 41 includes all of the same functionality as the control module described with reference to FIG. 3, but module 41 includes additional functionality, an enhanced ARP function 45, that operates to shrink the data loss window during a link failure event. Specifically, in the event that a link connected to one of the ports on switch 40 fails, the spanning tree protocol (STP) quickly detects this failure and can communicate this link failure information to a layer-3 protocol running on the router which among other things maintains a link state database stored on the router 40. The enhanced ARP function 45 included in the L3-RPM of control module 41 operates to override/disable standard ARP functionality that flushes ARP cache in the event that a link state failure is detected. The over-ride function 45 disables the ARP flush function until the standard ARP functionality has received the network address information needed to update the invalidated routing table entry, and function 45 replaces unicast port information included in an ARP cache entry associated with a port that was previously blocked (but is not active) with the identify of a multicast port that is a member of a VLAN, such as VLAN 20 in FIG. 2. Replacing the unicast port information with multicast port information in this manner allows packets received by the switch 40 for egress out a port associated with a failed link, and which would otherwise be dropped, to be forwarded to their destinations over another newly enabled port. A more detailed description of the component parts and operation of the enhanced ARP function 45 is presented with reference to FIG. 5.

Figure 5:
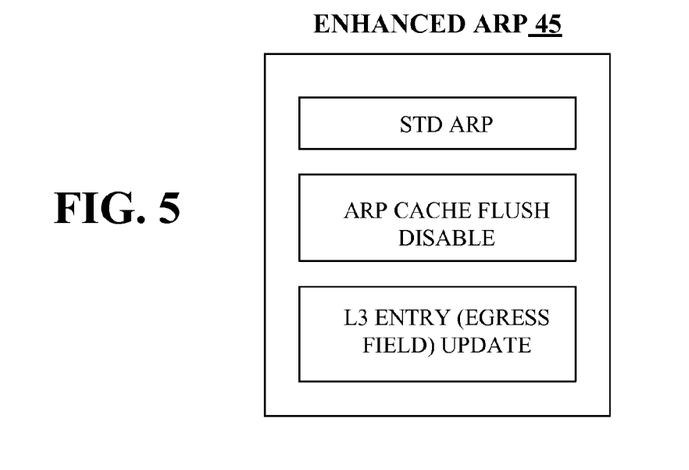
FIG. 5 is a block diagram of the functional elements that can comprise an enhanced ARP function.

FIG. 5 is a block diagram showing the functional elements that can comprise the enhanced ARP function 45 described above with reference to FIG. 4. The enhanced ARP functionality is comprised of a standard ARP function, an ARP cache flush disable function and an ARP cache entry egress field update function. The standard ARP functionality will not be described here as this functionality is well known to communication network engineers. The ARP cache flush disable function is invoked when the standard ARP functionality receives a message from the STP functionality operating in the L2-RPM of control module 41 described earlier with reference to FIG. 4. The disable function effectively overrides the standard ARP functionality to prevent it from flushing the ARP cache associated with a port connected to a failed link. This flush disable function overrides the standard ARP cache flushing functionality for as long as it takes the standard ARP functionality to learn the IP/MAC address pairs of the network devices reachable through a port that is enabled by the spanning tree protocol (STP), for instance, after a failed port is disabled/blocked. The egress field update functionality operates to update an egress port field in the ARP table entry of a port associated with a field link by replacing the port ID associated with the failed link with the identify of one or more multicast ports that are members of a VLAN that the ports are members of (the ports in this case can be the port connected to the failed link and the previously blocked port that was enabled as the result of the link failure). The progression of ARP cache entries from prior to a port failure, after a port failure and after a ARP cache entry is updated is illustrated below with reference for FIGS. 6A, 6B and 6C respectively.

Figure 6A:
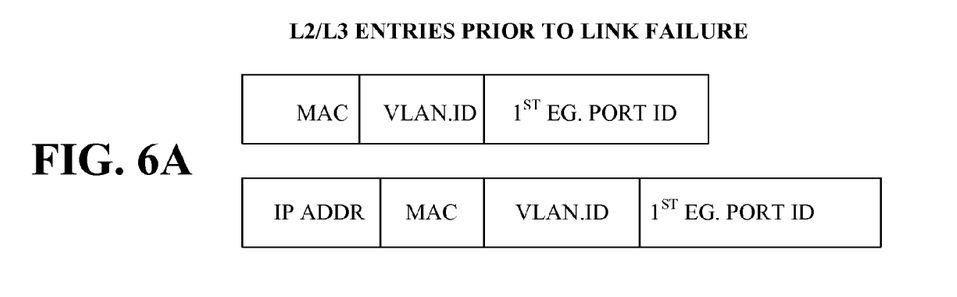
FIG. 6A shows the format of L2 and L3 forwarding table entries prior to the failure of a link.
Figure 6B:
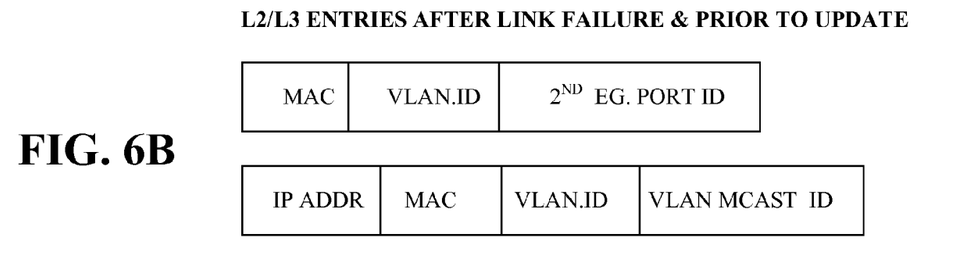
FIG. 6B shows the format of L2 and L3 forwarding table entries according to one embodiment after the failure of a link.
Figure 6C:
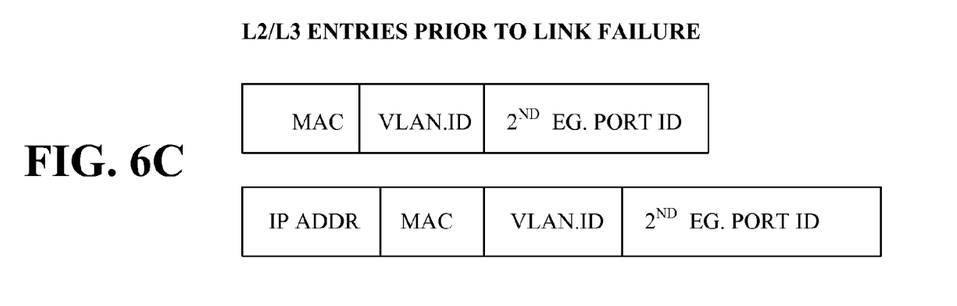
FIG. 6C shows the format of L2 and L3 forwarding table entries prior to the failure of a link.

FIG. 6A illustrates information included in three fields of an L2 and L3 entry that can be included in forwarding tables stored in a line card, such as the line card 42 of FIG. 4. Each table entry is associated with a particular port on a switch, and there can be multiple table entries associated with each port. The first field comprising the L2 table entry can include a MAC destination address of a network device that is reachable from the switch in which the table entry is stored, such as switch 40 of FIG. 4, the second field can include information relating to the identify of a VLAN that the port is a member of, and the third field can include the identify of a first egress port, which is a currently active port over which packets are being forwarded to a next hope address included in the first field of the table entry. The first field in the L3 table entry can include the destination IP address of a network device to which packets received by switch 40 can be forwarded. The second field in the L3 table entry can include the destination MAC address included in the first field of the L2 table entry above. The third field in the L3 table entry can include the VLAN identify included in the second field of the L2 table entry above, and the forth field of the L3 table entry can include the identity of the first egress port that was included in the third field of the L2 table entry above.

In the event that the link connected to the first egress port on switch 40 associated with the L2 and L3 forwarding tables described earlier, with reference to FIG. 6A, is detected to have failed, the spanning tree protocol disables the first port and enables a second, previously blocked port, on switch 40 and all of the Layer-2 entries pointing out of the failed port are flushed. After the Layer-2 entries are flushed, the Switch hardware, which can be implemented in the packet processor for instance, floods the data traffic through all the other member ports of the VLAN of which the first port is a member, thus Layer-2 traffic can continue to be forwarded without the loss, or with the minimal loss of packets. In the meantime, Switch hardware re-learns the Layer-2 entries from the data traffic and the L2 Manager installs these newly learnt entries in the Layer-2 tables, so that the data traffic can be forwarded (without flooding) to the corresponding ports. However, it takes quite a bit longer to update Layer-3 tables for the one or more table entries associated with the recently enabled second port. During the time that ARP is gathering the network device address information it needs to update the L3 table entry associated with the second port, the egress field update function of FIG. 5 operates to place the identifies of the multicast port that are members of the VLAN into table entries associated with the second port. This is shown with reference to FIG. 6B where the VLAN multicast port ID is placed into the forth field of the L3 entry.

After a period of time, typically several seconds, the ARP resolves the network device addresses that are reachable through the second port, and it updates one or more L3 table entries with the updated network device address information (IP address/MAC address pairs). This L3 table entry update is shown with reference to FIG. 6C which shows the forth field of the table pointing to the second port or the port that is now enabled.

Figure 7A:
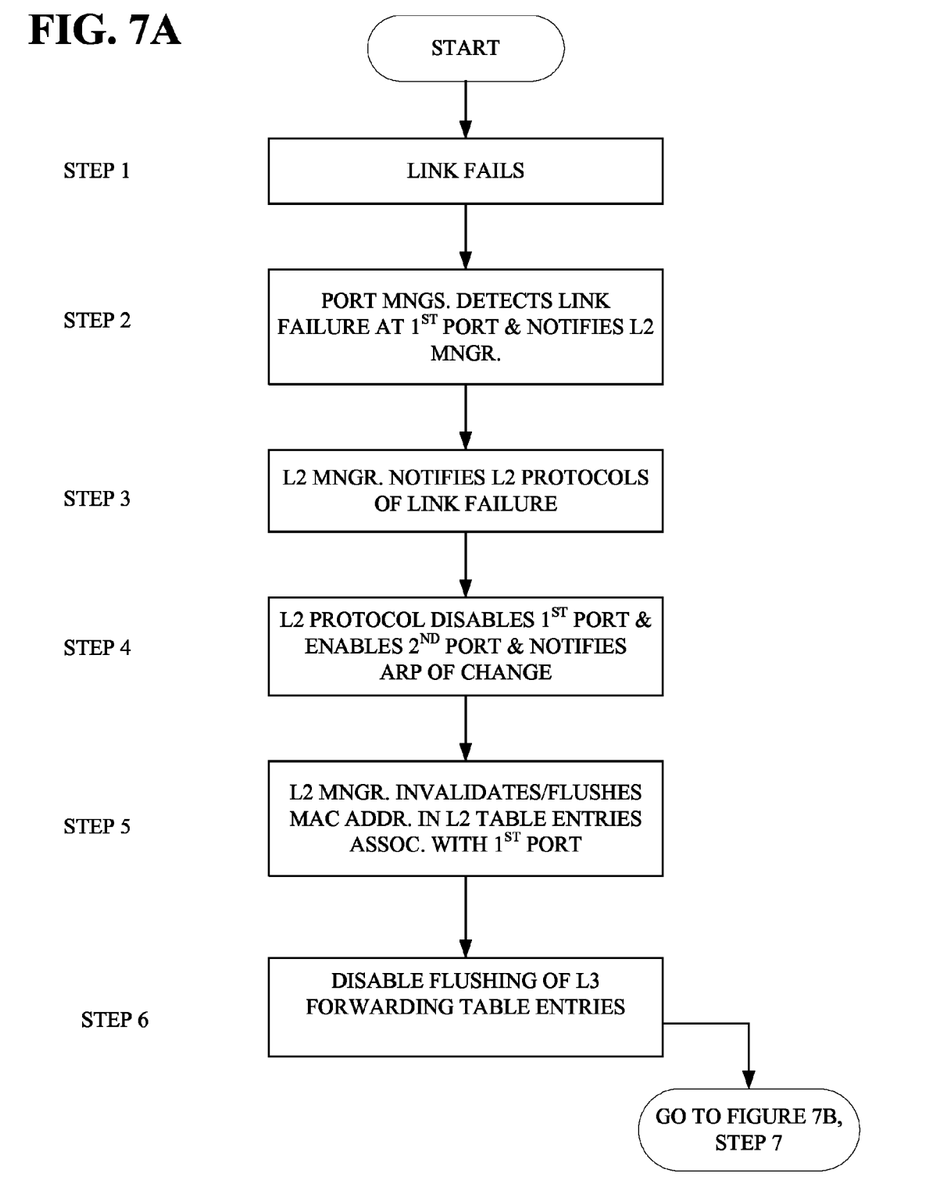
FIGS. 7A, 7B, and 7C is a logical flow diagram of one embodiment of a process that operates to shrink a data loss window during the link failure.
Figure 7B:
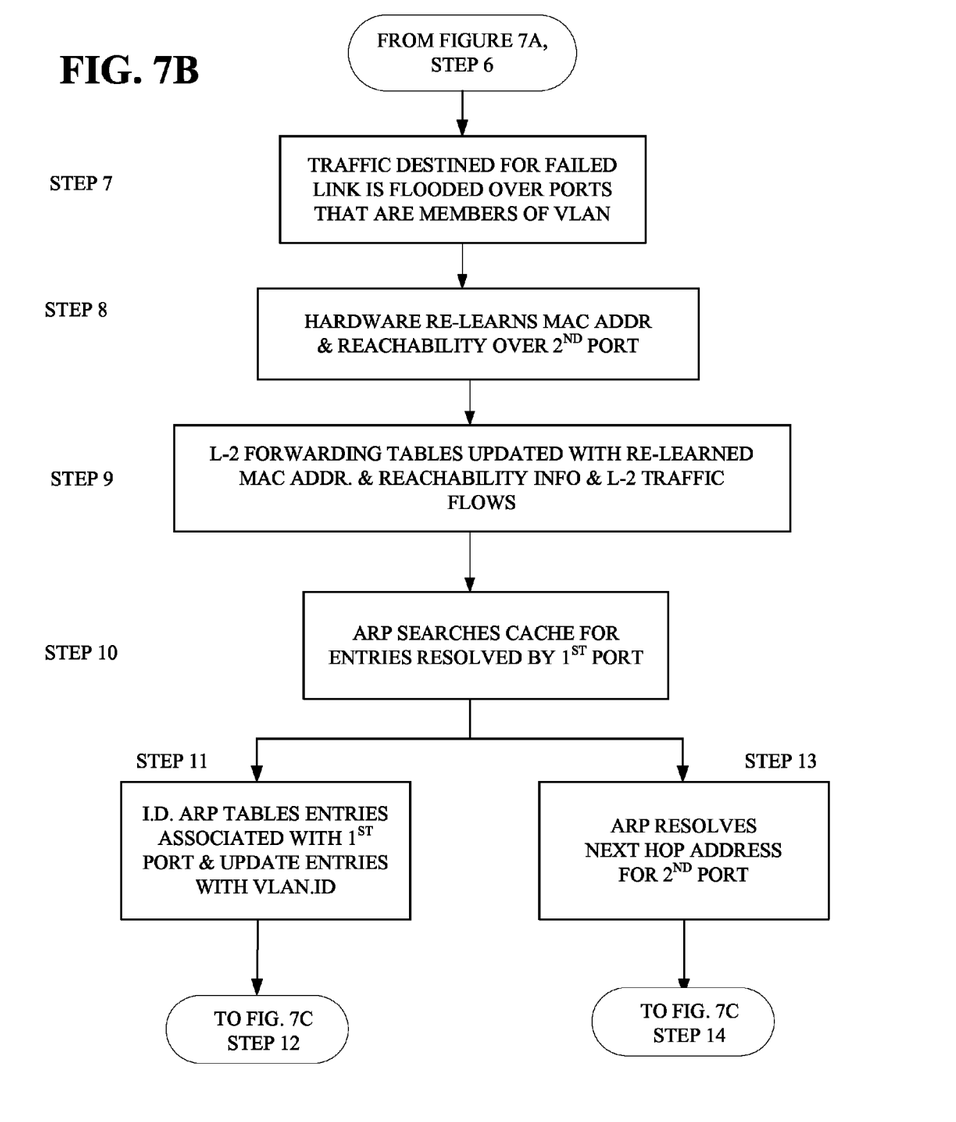
Figure 7C:
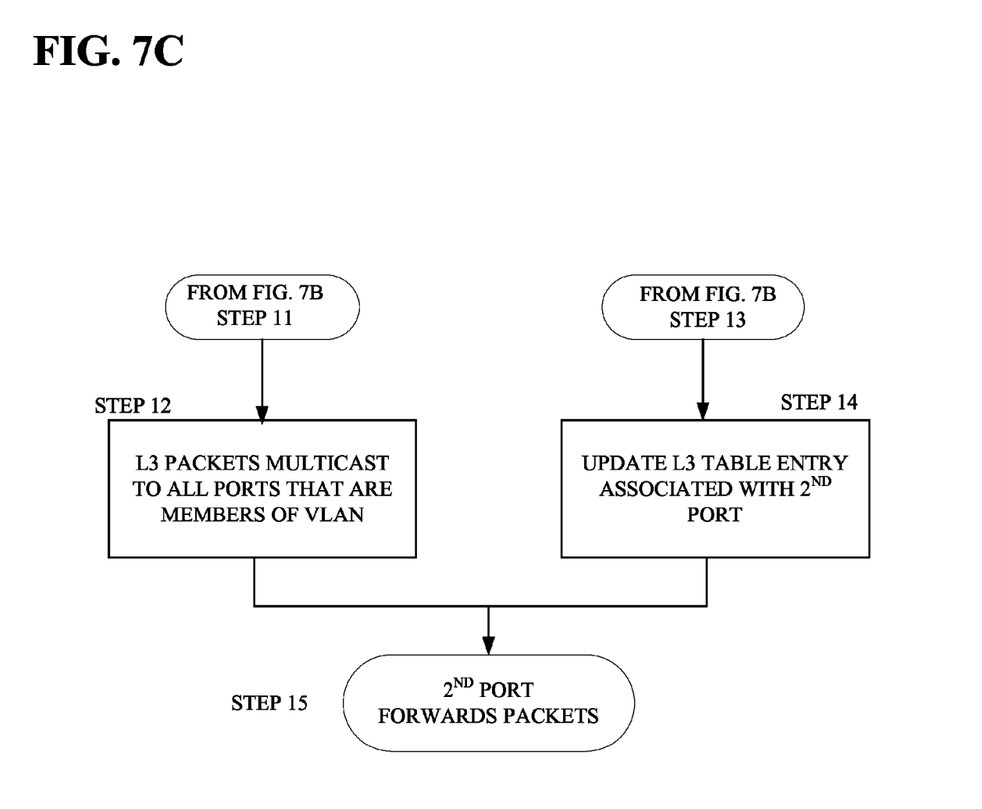

FIGS. 7A-7C represents a logical flow diagram of one embodiment of the process employed to update layer-3 table entries in the event that a link connected to an associated port fails. It may be helpful to refer to FIGS. 2, 4 and 6A-C for the context of the description relating to FIG. 7. In Step 1 of FIG. 7A, a link connected to a first port on switch 40 of FIG. 4 fails. In Step 2, the port manager described with reference to FIG. 4 detects the change in link state on the first port and sends a message to the L2 agent on the line card 42 of FIG. 4 that includes notice of the link failure. In Step 3 the L2 agent notifies a L2 protocol, such as the spanning tree protocol (STP) that the link connect to the first port has failed, and in Step 4 the L2 protocol disables the first port, enables a previously blocked port (second port), and sends a message to the address resolution protocol (ARP) running on the L3-RPM of switch 40 notifying it of the change in port state (first port disabled and second port enabled). In step 5, the L2 agent invalidates the L2 table entries associated with the first port and then deletes/flushes the table entries. One such L2 table entry is described with reference to FIG. 6A. Then, in step 6, the standard ARP flush functionality included in the enhanced ARP module 45 of FIG. 4 is disabled and the process proceeds to step 7. Disabling this ARP cache flushing function results in the retention of all ARP cache entries that are associated with the first port.

Referring now to FIG. 7B, in step 7 hardware, implemented in the packet processor in switch 40, causes the traffic destined for the first port to be flooded to all of the ports on switch 40 that are members of the VLAN. This is necessary as all of the table entries associated with the first port are flushed. In step 8 the switch 40 hardware learns/re-learns the MAC address and reachability information for the second port from the traffic (packets) that are flooded over the VLAN. In step 9, the L2 agent on the switch 40 line card and the L2 manager in the control module 41 cooperate update the L2 forwarding table with the MAC information learned in step 8. At this point, L2 traffic through switch 41 starts to flow according to updated information included in the L2 forwarding table. In step 10 the ARP located in the L3-RPM of switch 40 traverses ARP cache (ARP cache can be stored in the routing tables in the L3-RPM of switch 40) searching for ARP entries (i.e. next hop MAC addresses) that were resolved over the failed link by the first port. It should be understood that the standard ARP functionality will otherwise flush these entries and so these entries are not typically available to be searched. However, according to an embodiment, an enhanced ARP function is employed that overrides or disables this standard ARP cache flush functionality so that these entries are available to be searched. In Step 11, the entries identified by the ARP as the result step 10 are updated as described earlier with reference to FIG. 6B to include the VLAN.ID associated with the second port. Specifically, the ARP can update the egress field in the L3 table entry, as described in 6B, to include the identities of the one or more ports that are members of the VLAN. The updating of this L3 table entry egress field with the VLAN multicast information is only temporary until the standard ARP functionality resolves the addresses for these tables entries. Updating the L3 table entry in this manner allows switch 40 to, in Step 12 of FIG. 7C, continue to forward packets by multicasting them over all of the member ports of the VLAN. Forwarding the packets in this manner results in a minimal loss of packets. Depending upon the size of an ARP cache, it can take on the order of seconds to update the cache after the failure of a link, and during this time all of the traffic that should be forwarded out the port connected to the failed link can be dropped. In contrast to the prior art method, it takes only on the order of milliseconds for the method described in the embodiment of FIGS. 7A and 7B to update the L3 table entry after being disabled, therefore little if any traffic is typically lost.

While the ARP cache tables are being updated as described in Step 11 of FIG. 7B, in Step 13 of FIG. 7B, the standard ARP functionality proceeds to resolve the next hop addresses for the second port, which has just been enabled. In Step 14 of FIG. 7C, the egress field table entries associated with the second port are updated (temporary egress information is replaced) with the address information gathered by the ARP in Step 13. At this point, the process proceeds to Step 15 where the switch 40 proceeds to forward packets over the second port in the normal fashion.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for diminishing data lost at a packet network device as the result of a failed communication link, comprising:
    detecting a failure of a communication link to which a first egress port in a packet network device is connected;
    in response to the detected failure, disabling the first egress port and enabling a second egress port on the packet network device that was previously blocked and that is a member of the same VLAN as the first egress port;
    using an address resolution protocol cache flush disable function to temporarily inhibit a standard address resolution protocol function from removing layer-3 forwarding table entries associated with the disabled first egress port while updated layer-3 forwarding information for the second egress port is learned;
    identifying one or more layer-3 table entries associated with the disabled first egress port and using a layer-3 forwarding table update function to replace a portion of each of the one or more layer-3 forwarding table entries with a multicast identity of the VLAN such that traffic destined for the disabled first egress port is temporarily flooded to a plurality of ports that are members of the VLAN; and
    updating the one or more layer-3 forwarding table entries to replace the multicast identity of the VLAN with the learned layer-3 forwarding information for the second egress port.

2. The method of claim 1 wherein the failure of the communication link is manifested by the inability of the packet network device to successfully forward data over the first egress port.

3. The method of claim 1 wherein the packet network device is a network switch, a network router or both a switch and a router.

4. The method of claim 1 wherein each of the one or more layer-3 forwarding table entries are comprised of an IP address, a medium access control address, a VLAN identity and an egress port identity.

5. The method of claim 1 wherein address resolution protocol cache flush disable function, the standard address resolution protocol function, and the layer-3 forwarding table update function are included in an enhanced address resolution protocol function provided by a layer-3 route processor module.

6. The method of claim 1 wherein the second port was previously blocked according to the spanning tree protocol.

7. The method of claim 1 wherein the update layer-3 forwarding information is comprised of a medium access control (MAC) address and an identity of a port over which the MAC address is learned.

8. The method of claim 1 wherein the portion of the layer-3 table entry that is replaced with the multicast identity of the VLAN includes an egress port identity.

9. The method of claim 1 wherein the multicast identity of the VLAN includes the identity of two or more egress ports that are members of the VLAN.

10. The method of claim 1 wherein the updating all of the layer-3 forwarding table entries associated with the second port to replace the multicast identity of the VLAN with the learned layer-3 forwarding information for the second egress port includes replacing one or more of an IP address, a medium access control address and a port identity.

11. A packet network device, comprising:
    a control module that is operable to run layer-2 and layer-3 network protocols and to run an enhanced address resolution protocol function that includes a standard address resolution protocol function, an address resolution protocol cache flush disable function, and a layer-3 forwarding table update function;
    one or more line cards each of which includes a packet processor, a port manager, memory to store one or more forwarding tables, and a plurality of ingress and egress ports connected to external network communication links, wherein the control module and the one or more line cards cooperate in the event of a link failure that effects a first of the plurality of egress ports to:
    disable the first of the plurality of egress ports and enable a second of the plurality of the egress ports that was previously blocked and that is a member of the same VLAN as the first of the plurality of egress ports;
    use the address resolution protocol cache flush disable function to temporarily inhibit the standard address resolution protocol function from removing layer-3 forwarding table entries associated with the disabled first of the plurality of the egress ports while layer-3 update forwarding information is learned for the second of the plurality of egress ports;

identify one or more layer-3 forwarding table entries associated with the disabled first of the plurality of the egress ports and use the layer-3 forwarding table update function to replace a portion of each of the one or more layer-3 forwarding table entries with a multicast identity of the VLAN such that traffic destined for the disabled first of the plurality of egress ports is temporarily flooded to a plurality of egress ports that are members of the VLAN; and update the one or more layer-3 forwarding table entries to replace the multicast identity of the VLAN with the learned layer-3 forwarding information for the second egress port.

12. The packet network device of claim 11, wherein the control module and the one or more line cards are included in a network switch, a network router, or a combined network switch and network router.

13. The packet network device of claim 11, wherein the control module is comprised of a layer-2 route processor module and a layer-3 route processor module.

14. The packet network device of claim 13 wherein the layer-2 route processor module is comprised of layer-2 network protocols, layer-2 switching tables, VLAN information, a layer-2 manager and a link state database, and the layer-3 route processor module is comprised of layer-3 network protocols, layer-3 routing tables, the enhanced address resolution protocol function, and a layer-3 routing table manager.

15. The packet network device of claim 11 wherein the packet processor operates to examine a received packet of information to determine how to forward the packet over the network.

16. The packet network device of claim 11 wherein the port manager operates to disable and enable any one of the plurality of the egress ports.

\* \* \* \* \*